(12) United States Patent
Morazan

(10) Patent No.: US 7,562,928 B1
(45) Date of Patent: Jul. 21, 2009

(54) AUTOMATED VEHICLE SUNSHADE

(76) Inventor: Harold Morazan, 2597 W. Silver Streak Way, Queen Creek, AZ (US) 85242

( * ) Notice: Subject to any disclaimer, the term of this patent is extended or adjusted under 35 U.S.C. 154(b) by 0 days.

(21) Appl. No.: 11/695,522

(22) Filed: Apr. 2, 2007

Related U.S. Application Data

(60) Provisional application No. 60/744,093, filed on Mar. 31, 2006.

(51) Int. Cl.
B60J 7/20 (2006.01)
(52) U.S. Cl. .............................. 296/136.01; 296/136.12
(58) Field of Classification Search ............ 296/136.01, 296/97.2, 97.6, 97.9, 97.1, 97.4, 136.03, 296/136.12, 136.04; 135/33.2, 121, 88.01
See application file for complete search history.

(56) References Cited

U.S. PATENT DOCUMENTS

| | | | |
|---|---|---|---|
| 1,431,775 A * | 10/1922 | Cannon, Jr. et al. ......... | 135/33.4 |
| 1,999,171 A * | 4/1935 | Bryant .................. | 296/136.03 |
| 2,325,645 A * | 7/1943 | White ......................... | 135/98 |
| 2,508,757 A * | 5/1950 | Gray ........................ | 135/88.08 |
| 2,571,362 A * | 10/1951 | Hervey .................. | 296/136.12 |
| 2,598,940 A * | 6/1952 | Robie ......................... | 296/110 |
| 2,616,571 A * | 11/1952 | Griffin ......................... | 135/16 |
| 2,635,615 A * | 4/1953 | Rice ......................... | 138/88.07 |
| 2,948,287 A * | 8/1960 | Rupert ........................ | 135/126 |
| 4,349,040 A * | 9/1982 | Miller ......................... | 135/147 |
| 4,605,030 A * | 8/1986 | Johnson .................... | 135/88.06 |
| 4,684,165 A * | 8/1987 | Becker ................... | 296/136.12 |
| 4,805,654 A * | 2/1989 | Wang ......................... | 135/88.07 |
| 4,998,768 A * | 3/1991 | Wu ........................ | 296/136.12 |
| 5,186,511 A * | 2/1993 | Hwang ......................... | 296/95.1 |
| 5,213,123 A * | 5/1993 | Whitfield ..................... | 135/27 |
| 5,230,545 A * | 7/1993 | Huang et al. ................ | 296/95.1 |
| 5,263,505 A * | 11/1993 | Yeom ......................... | 135/20.1 |
| 5,287,871 A * | 2/1994 | Trice ......................... | 135/88.05 |
| 5,355,902 A * | 10/1994 | Schlangen .................. | 135/20.1 |
| 5,388,883 A * | 2/1995 | Yang ........................ | 296/136.1 |
| 5,433,233 A * | 7/1995 | Shiran et al. ................ | 135/20.1 |
| 5,441,066 A * | 8/1995 | Harris ........................ | 135/88.01 |
| 5,597,005 A * | 1/1997 | Thomas ........................ | 135/87 |
| 5,601,103 A * | 2/1997 | Dubinsky ................... | 135/33.7 |
| 5,850,843 A * | 12/1998 | Mahood et al. ........... | 135/88.06 |
| 5,921,259 A * | 7/1999 | Ehler ........................ | 135/88.14 |
| 6,089,245 A * | 7/2000 | Tseytlin et al. ............ | 135/88.01 |
| 6,116,256 A * | 9/2000 | Pawsey et al. .............. | 135/147 |
| 6,206,451 B1 * | 3/2001 | Maano ................... | 296/136.04 |
| 6,305,394 B1 * | 10/2001 | Reese ......................... | 135/20.1 |
| 6,513,858 B1 * | 2/2003 | Li et al. ......................... | 296/98 |
| 6,568,737 B1 * | 5/2003 | Li .............................. | 296/95.1 |
| 6,718,995 B2 * | 4/2004 | Dotterweich ................ | 135/131 |
| 6,916,043 B2 * | 7/2005 | Rhea et al. ............. | 296/136.01 |
| 6,935,674 B1 * | 8/2005 | Campos ................... | 296/136.1 |

(Continued)

Primary Examiner—Kiran B. Patel
(74) Attorney, Agent, or Firm—Schmeiser, Olsen & Watts LLP

(57) ABSTRACT

An automated vehicle sunshade includes a compartment mountable to a roof of a vehicle, a flexible shade, a plurality of rods coupled to the flexible shade and a drive device coupled to the plurality of rods. The plurality of rods are retractable and extendable so that the sunshade repeatably alternates between an extended position and a retracted position. In the retracted position, the flexible shade, plurality of rods and drive device are enclosed within the compartment. The sunshade also includes guide wires and support wires for properly guiding and supporting the flexible shade during retracting and extending.

8 Claims, 18 Drawing Sheets

U.S. PATENT DOCUMENTS

| | | | |
|---|---|---|---|
| 7,008,002 B2 * | 3/2006 | Rhea et al. | 296/136.01 |
| 7,013,904 B2 * | 3/2006 | Kofler | 135/132 |
| 7,137,660 B2 * | 11/2006 | Weddington et al. | 296/105 |
| 7,137,661 B2 * | 11/2006 | Neuer et al. | 296/136.01 |
| 7,225,822 B1 * | 6/2007 | Zheng | 135/126 |
| 7,240,684 B2 * | 7/2007 | Yang | 135/88.7 |
| 7,354,096 B2 * | 4/2008 | Hacker | 296/136.12 |
| 2001/0045758 A1 * | 11/2001 | Vieira-Soares | 296/98 |
| 2004/0135393 A1 * | 7/2004 | Neuer et al. | 296/136.1 |
| 2006/0267372 A1 * | 11/2006 | Funk | 296/136.12 |

* cited by examiner

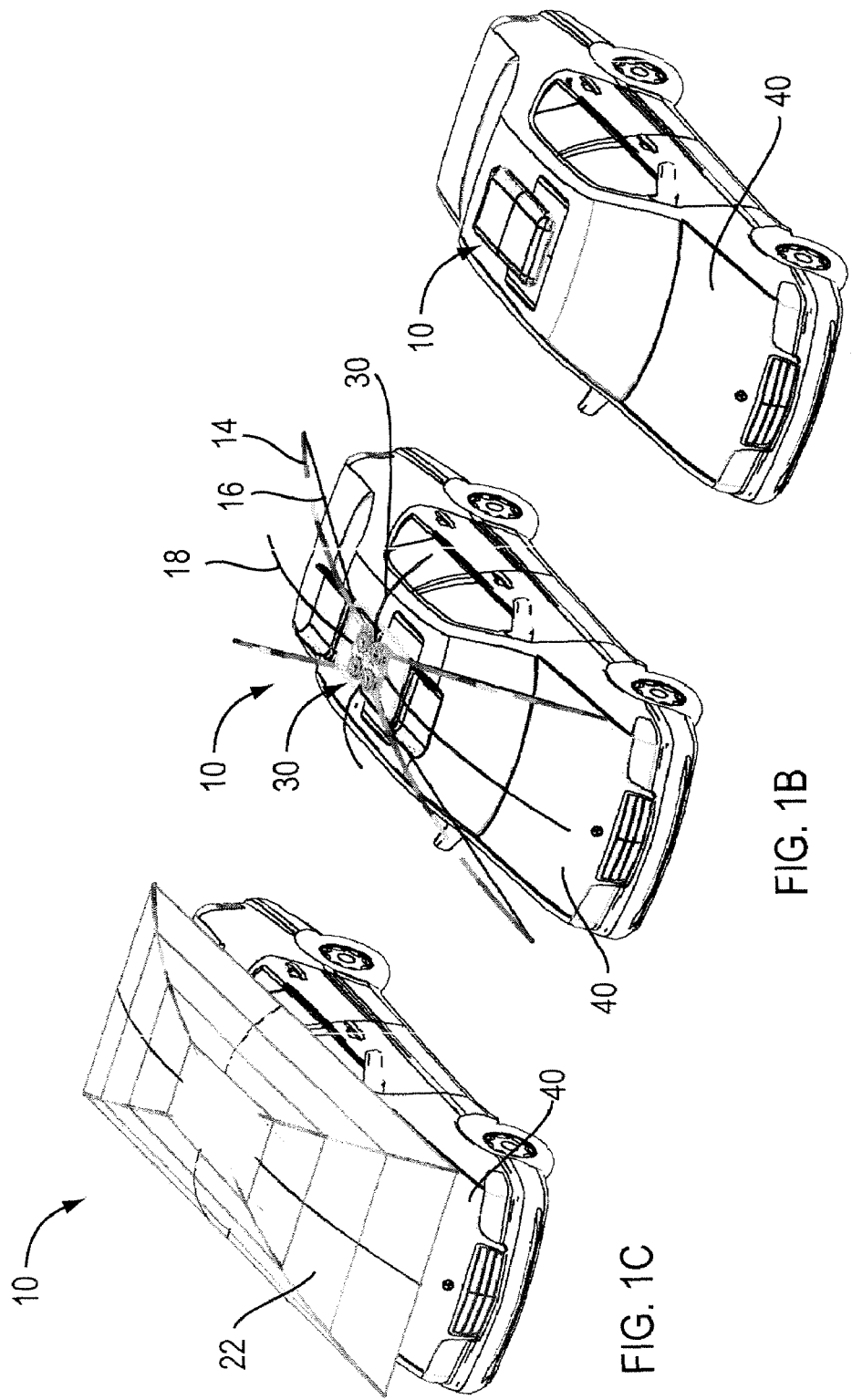

1. Red0 - Open
3. Black0 - Ground
5. Blue0 - Close
7. Yellow - 12V
9. Brown - Signal sensor
2. Not Connected
4. Not Connected
6. Not Connected
8. Blue - Motor1
10. Blue - Motor2

1. Red0 - Open
3. Black0 - Ground
5. Blue0 - Close
7. Yellow - 12V
9. Brown - Signal sensor
2. Not Connected
4. Not Connected
6. Not Connected
8. Blue - Motor1
10. Blue - Motor2

AUTOMATED VEHICLE SUNSHADE

CROSS REFERENCE TO RELATED APPLICATION

This claims priority to U.S. Provisional Patent Application to Harold Morazan entitled "AUTOMATED VEHICLE SUNSHADE," Ser. No. 60/744,093, filed Mar. 31, 2006, the disclosures of which are hereby incorporated entirely herein by reference.

BACKGROUND OF THE INVENTION

1. Technical Field

This invention relates generally to a vehicle sunshade and more particularly to an automated vehicle sunshade.

2. State of the Art

Vehicles are driven to various places that people need to go and are often parked in a parking lot that is open and exposed to the elements of nature. The weather conditions often affect the vehicles parked in these types of parking lots. One type of weather condition that is of particular concern is a sunny, hot day. With the temperature being hot and a vehicle exposed to the sun for extended periods of time, the rays of the sun enter the vehicle through the windows and the vehicle becomes hotter than the ambient temperature outside of the vehicle. This often causes great discomfort for people who must then enter the vehicle and in some instances can even cause harm such as burning of the person within the car.

This concern is greater in regional locations where the temperature is consistently hot for a substantial period of time. In these types of locations, people often tint their vehicle windows and/or use conventional sunshades in an attempt to block or deflect at least a portion of the sun rays entering the vehicle. While shade serves to provide a much cooler vehicle, the conventional sunshades have several limitations.

Conventional sunshades are typically made for use on the windshield. This allows the owner of the vehicle to block a portion of the sun from entering the car, but cannot block the sun from entering all of the windows of the vehicle. Often, the owner will park in such a direction that most of the sun will be blocked during the time the vehicle is parked in that particular location.

Further, other typical sunshades may be used to block the sun from portions of other windows by use of sunshades with suction cups to retain them on the window. These often fall and do not cover the entire window, thereby exposing the inside of the vehicle to the sun. Additionally, as the type of vehicle changes, the need for different types of sunshades is required to account for the varying types of windows on the vehicle.

Conventional sunshades are limited to only providing shade to the inner portion of the vehicle and do not protect the outer vehicle parts from exposure to the sun. For example, and not as a limitation, vehicle doors and door handles are often formed of a type of metal. The metal exposed to the sun often heats to a degree that it is hot to the touch causing difficulty to the person attempting to open the hot door who must grasp the hot handle. Further still, the vehicle engine is hot and starting can result in inefficient starting and consumption of greater fuel.

Due to the limitations of conventional sunshades, owners often use other means to block the sun from certain vehicle parts. For example, and without limitation, a steering wheel cover is used to protect the steering wheel and provide a material that does not heat as easily, a towel or other cover is used to cover parts such as a seat belt buckle, a car seat and even leather or vinyl seats.

Additionally, while the sun is often a problem in warmer climates, colder climates have other needs with their vehicle windows. For example, in climates were there is snow, conventional methods of removing snow from a window of a vehicle include the use of a brush to brush the windows free from snow. Additionally, in cold climates, ice forms on the windshield and other vehicle windows. An ice scrapper is often utilized to free the window from ice.

Accordingly, there is a need in the field of vehicle sunshades for an improved vehicle sunshade.

DISCLOSURE OF THE INVENTION

The present invention relates to an automated vehicle sunshade that provides shade to all windows of a vehicle independent of the sun location and further provides shade to portions of the vehicle exterior.

An aspect of the present invention includes an automated vehicle sunshade comprising a compartment mountable to a roof of a vehicle, a flexible shade, retractable, extendable rods having a slight curvature coupled to the flexible shade and extendable to extend the shade over the vehicle and retractable to bring the shade within the compartment, guide wires coupled to the shade for providing proper guidance when the shade is retracted, and a drive device for driving the retractable extendable rods, wherein the compartment retains the shade, the retractable extendable rods, the guide wires and the drive device within the compartment when the shade is retracted.

The vehicle sunshade may further comprise, in other aspects of the present invention, a remote control for remotely activating the sunshade. The automated sunshade may further comprise a sensor that activates the drive device if certain weather conditions are sensed.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 1 is a perspective view of an automated sunshade mounted on a vehicle, in accordance with the present invention;

DETAILED DESCRIPTION OF EMBODIMENTS OF THE INVENTION

Figure 2A:
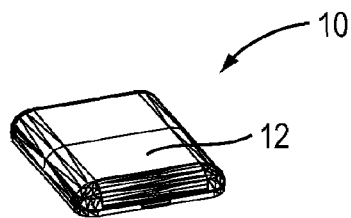
FIG. 2 is a perspective view of an automated sunshade, in accordance with the present invention.
Figure 2B:
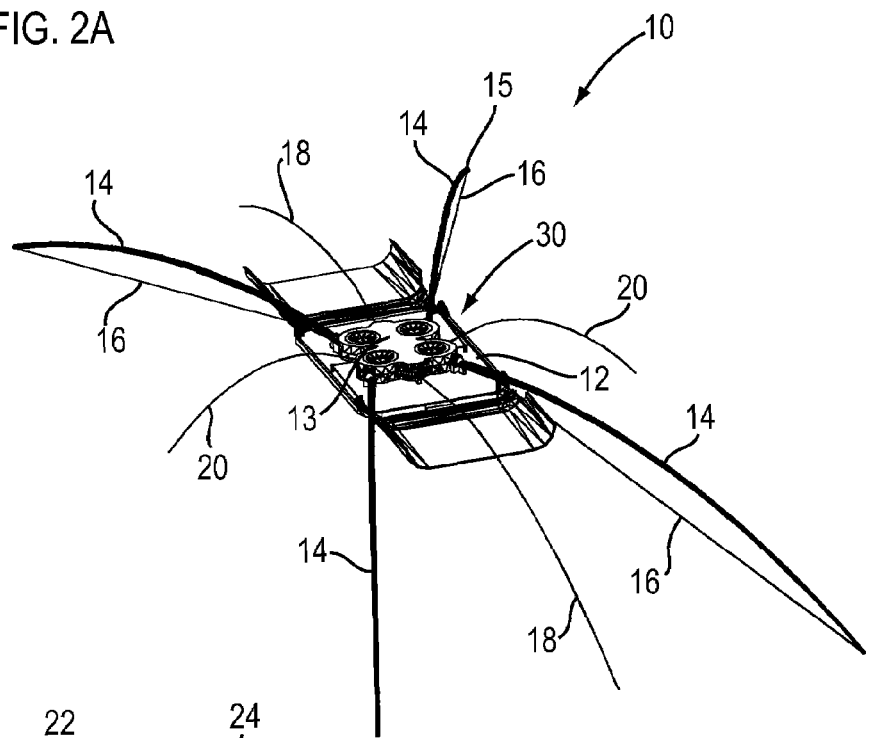
Figure 2C:
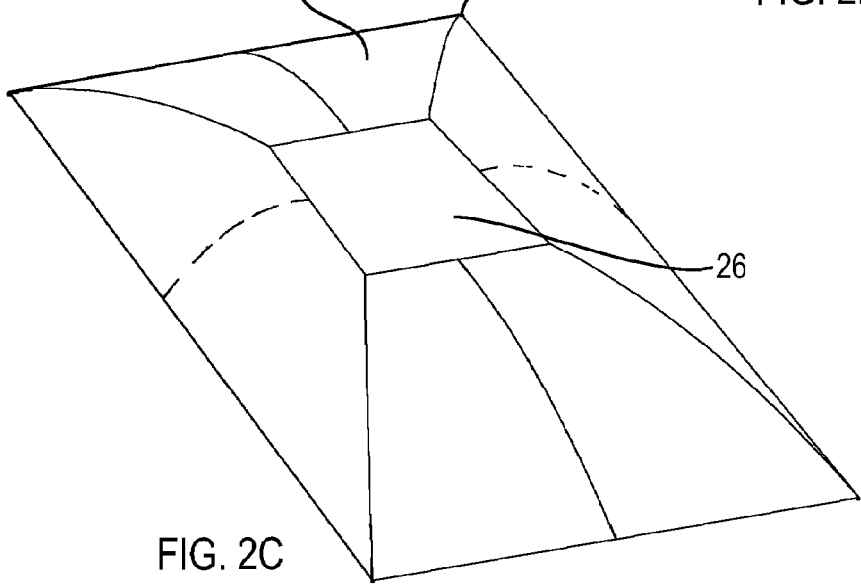

As discussed above, embodiments of the present invention relate to an automated vehicle sunshade that provides shade to all windows of a vehicle independent of the sun location and further provides shade to portions of the vehicle exterior.

As shown in FIGS. 1A-1C and 2A-2C, particular embodiments of the present invention include an automated vehicle sunshade 10. The sunshade 10 comprises a compartment 12, retractable extendable rods 14, support wires 16, guide wires 18 and 20, a shade 22 and a drive device 30. The retractable extendable rods 14 comprise a first end 13 and a second end 15 and may be telescopically extendable and retractable between an extended and a retracted position. The rods 14 may further have a predetermined curvature, such that when in the extended position, the second end 15 of the rods 14 extends below the first end 13 of the rods 14. Each retractable extendable rod 14 may be coupled at one end to the drive device 30 and at the other end to an end of the rod cable 16. The other end of the rod cable 16 may be coupled to the drive device 30 below the rod 14. The rod cable 16 may provide support for the rod 14 when the rod 14 is in the extended position. When the rod 14 is extended, the rod cable 16 is free to extend with the rod 14 into the extended position. When the rod 14 is retracted, the rod cable 16 is also retracted.

It will be understood by those of ordinary skill in the art, that the curvature of the rods 14 is not limited in the amount of curvature. So long as the rods 14 may be retracted within the compartment 12, the curvature of the rods 14 is proper. Further still, it will be understood that the present invention is not limited to rods, but may use other types of devices to support the shade, such as, but not limited to hinged members such as metal and the like in a zigzag configuration.

The shade 22 may be coupled to the retractable extendable rods 14. For the exemplary purposes of this disclosure and not as a limitation, the shade 22 may be a frusto-pyramidal shape. The corners 24 of the shade 22 may be coupled to the second ends 15 of the retractable extendable rods 14. A center portion 26 of the shade 22 may be coupled to the compartment 12. The guide wires 18 may be transverse to the guide wires 20, wherein the guide wires 18 and 20 are coupled on one end to edges of the shade 22 extending between each of the second ends 15 of the rods 14 and coupled to the drive device 30 on another end. The guide wires 18 and 20 may be free to extend when the rods 14 are moved into the extended position. The guide wires 18 and 20 provide support and guidance for properly retracting the shade 22 within the compartment 12, wherein the drive device 30 retracts the guide wires 18 and 20, thereby retracting and folding in the shade 22. The drive device 30 may have gear ratios driving the retracting of each of the guide wires 18 and 20, the support wires 16 and the rods 14 wherein the retraction of each of the guide wires 18 and 20, the support wires 16 and the rods 14 occur substantially contemporaneously.

The shade 22 may be formed of a flexible, durable material that may easily be folded to a size that fits within the compartment 12. Further, particular embodiments of the present invention may include a shade that has apertures extending through portions of the shade to allow air and wind to pass through, thereby allowing the shade 22 to remain open in a certain amount of wind without causing damage to the sunshade 10.

Figure 3:
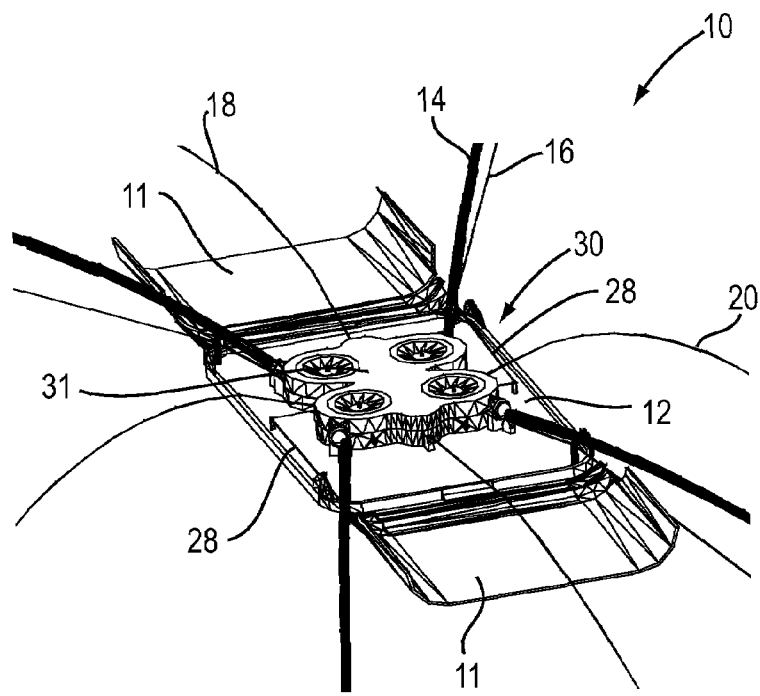
FIG. 3 is a perspective view of a portion of an automated sunshade in an extended position, in accordance with the present invention.

Referring further to the drawings, FIG. 3 depicts a portion of an automated vehicle sunshade 10 in an extended position according to particular embodiments of the present invention. In operation and with reference to FIG. 3, the automated sunshade 10 may be opened into an extended position. The compartment 12 may further comprise moveable flap portions 11. The flap portions 11 are moveable between an opened and a closed position wherein the opened position allows the shade to be extended and the closed position retains all the components of the sunshade 10 within the compartment 12. The drive device 30, covered by drive cover 31, may be activated, wherein the drive device extends the retractable extendable rods 14. As the rods 14 begin to extend, the rods 14 may engage the flap portions 11 and move the flaps 11 into the opened position. The support wires 16 and the guide wires 18 and 20 are not inhibited from extending with the rods 14. As the rods 14 extend, the shade 22 (as shown in FIG. 1) pulls the guide wires 18 and 20 into the extended position. Once the rods 14 are fully extended, the drive device 30 is automatically deactivated and the shade remains in the extended position. When in the extended position, the shade 22 may provide shade for not only all of the windows, but may also provide shade for a portion of the vehicle, including, but not limited to portions of the door, door handles, a portion of the hood, a portion of the trunk and the roof. This enables a user of the sunshade 10 to protect himself or herself from injury from touching hot metal when opening the vehicle door, and further provides shade to the hood and roof of the car to further limit the amount of heat transfer into the vehicle.

When shade is no longer desired over the vehicle, the sunshade 10 may be retracted. The drive device 30 may then be activated again. The drive device 30 now begins to retract the rods 14, the support wires 16 and the guide wires 18 and 20 substantially contemporaneously. The retraction of the guide wires 18 and 20 along with the rods 14 may provide proper folding of the shade such that the shade is folded into a size that fits within the compartment 12. Once the rods 14, support wires 16 and the guide wires 18 and 20 are fully retracted, the drive device 30 further retracts compartment cables 28, wherein the compartment cables 28 are coupled to the flaps 11. As the drive device 30 retracts the compartment cables 28, the flaps 11 are moved into the closed position and retain the other components of the sunshade 10 within the compartment 12. Once the flaps 11 are fully closed, the drive device 30 may automatically deactivate.

In other particular embodiments, the flaps 11 of the compartment 12 may be opened and closed automatically, such as by use of an actuator. The actuator may be, but is not limited to, hydraulic cylinders, mechanically driven linkages, slide mechanisms, and the like, so long as the flaps 11 may be automatically opened and closed.

Figure 4:
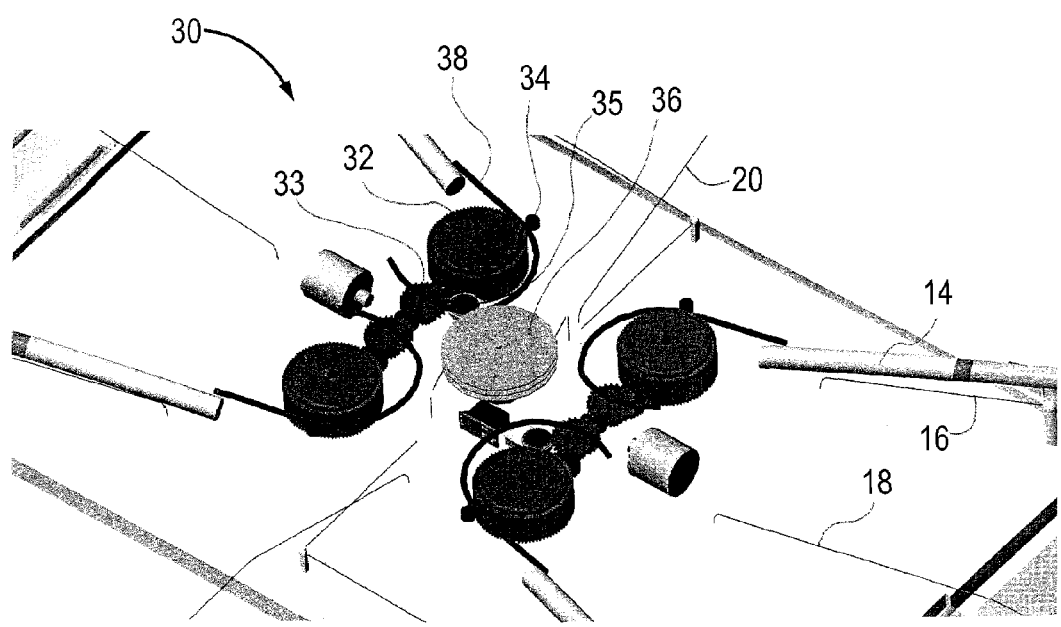
FIG. 4 is a perspective view of a drive device of an automated sunshade, in accordance with the present invention.

Referring further to the drawings, FIG. 4 depicts a particular embodiment of a drive device 30 in accordance to the present invention. The drive device 30 may comprise gears 32, 33, 34 and 35, motor 36 and rod cables 38. In operation, the motor 36 may be activated, wherein the activation of the motor 36 actuates the rotation of the gears 32, 33, 34 and 35. The gears 32, 33, 34 and 35 may be coupled to the rod cables 38 as well as the support wires 16 and the guide wires 18 and 20. The rod cables 38 extend and retract the rods 14 by mechanically coupling the rods to the drive device 30. The gears 32, 33, 34 and 35 have ratios that provide substantially contemporaneous extension and retraction of the rods 14, the support wires 16 and the guide wires 18 and 20. The motor 36 may be an electrical motor and has a power source and a controller. The controller of the drive device 30 provides the proper information as to when to activate and deactivate the motor 36.

It will be understood by those of ordinary skill in the art that while particular gears are shown, the orientation, placement and gear ratios may be any type of orientation, placement and gear ratio, so long as the shade is foldable within the compartment 12 and contained within the compartment 12.

Figure 5A:
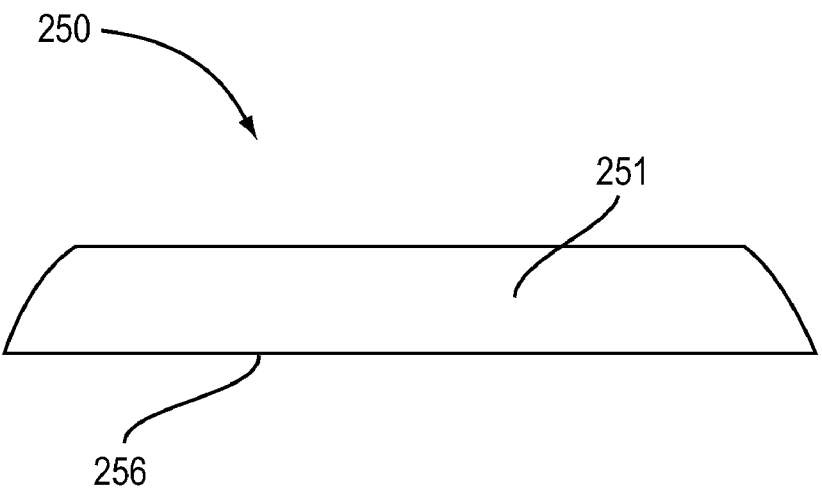
FIG. 5 is a side view of another embodiment of an automated sunshade, in accordance with the present invention
Figure 5B:
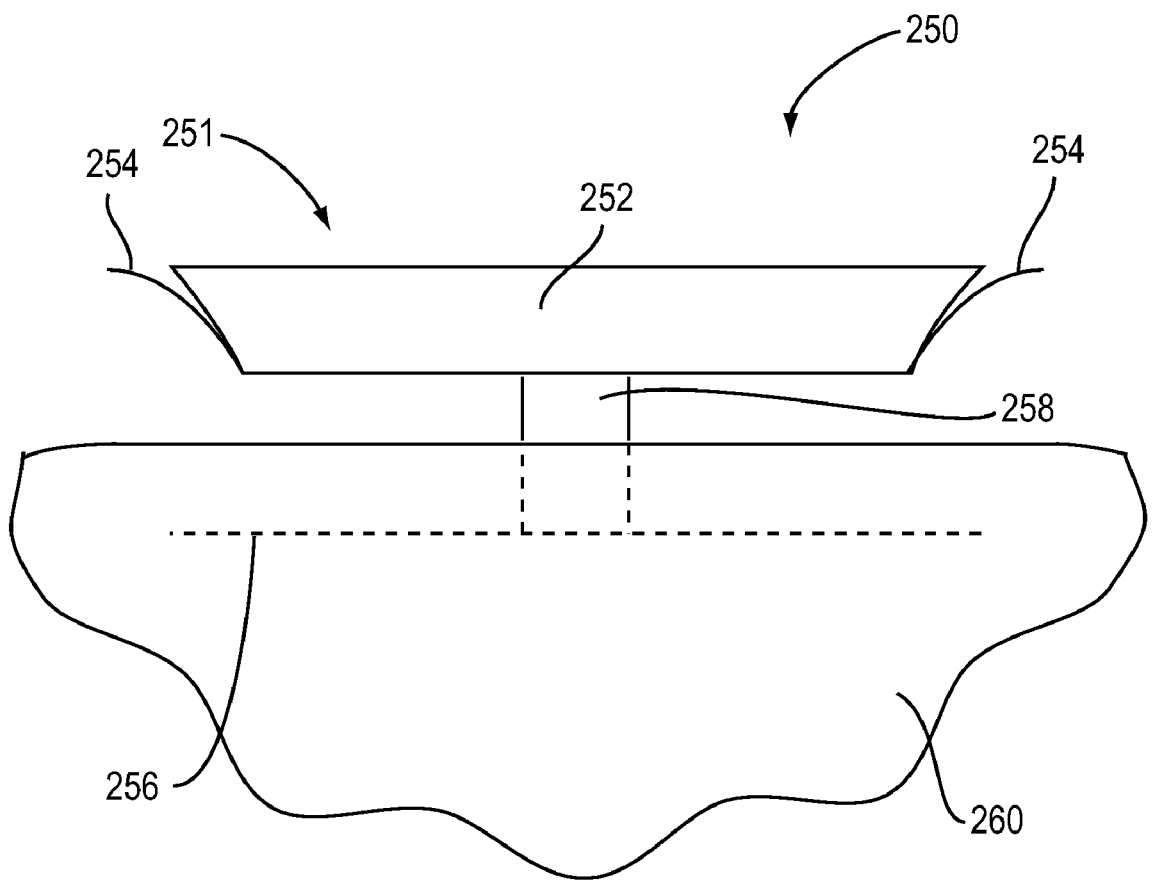

Referring again to the drawings, FIGS. 5A-5B depicts another embodiment of a vehicle sunshade 250. The sunshade 250 my have compartment comprising a cover 251 and a base 256. When the sunshade 250 is activated, the cover 251 extends in a direction away from the base 256. The cover 251 may further have two sets of opposing flaps 252 and 254. The flaps 252 and 254 may rotate so as to not inhibit the extension of the shade 260 from the base 256. The operation of other components of the vehicle sunshade 250 is the same as the operation of other embodiments of the present invention.

Figure 6:
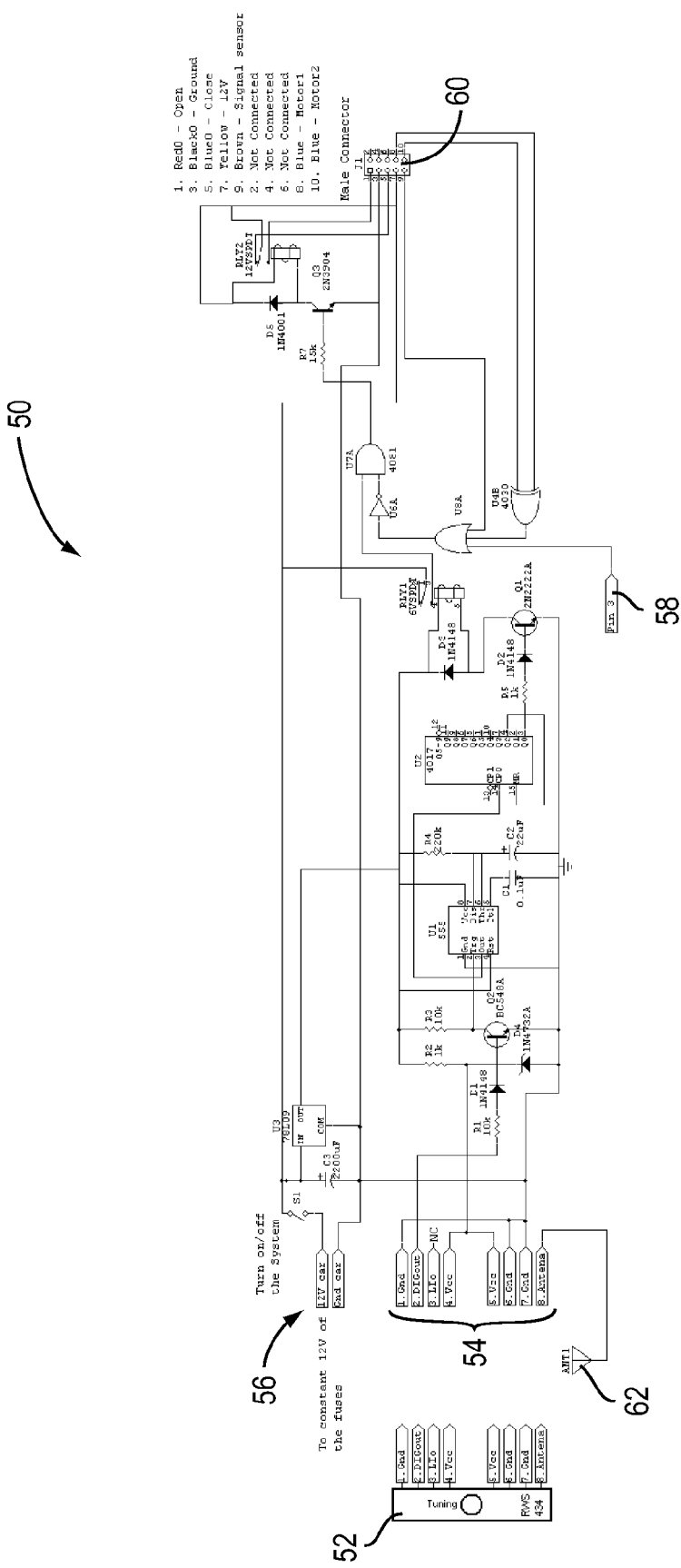
FIG. 6 is a schematic view of a reception circuit using an RWS-434 RF receiver.

With further reference to the drawings and for the exemplary purposes of this disclosure, FIGS. 6-12 depict a particular embodiment an automated vehicle sunshade utilizing an RWS-434 radio frequency receiver and a TWS-434A transmitter in accordance with the present invention. FIG. 6 shows a reception circuit 50 using the RWS-434 receiver. The circuit includes among other components, a tuner 52, a tuner connector 54 to connect the tuner 52 to the circuit 50, a battery connector 56, a starter connector 58, a drive device male connector 60 and an antenna 62. The antenna 62 receives the signal in accordance to the frequency provided by the tuner 52. The battery connector 56 provides the connection to a power source to operate the circuit 50. The male connector 60 is used to connect to the drive device of the vehicle sunshade. The starter connector 58 allows the starter of the vehicle to be connected to the circuit 50.

Figure 7:
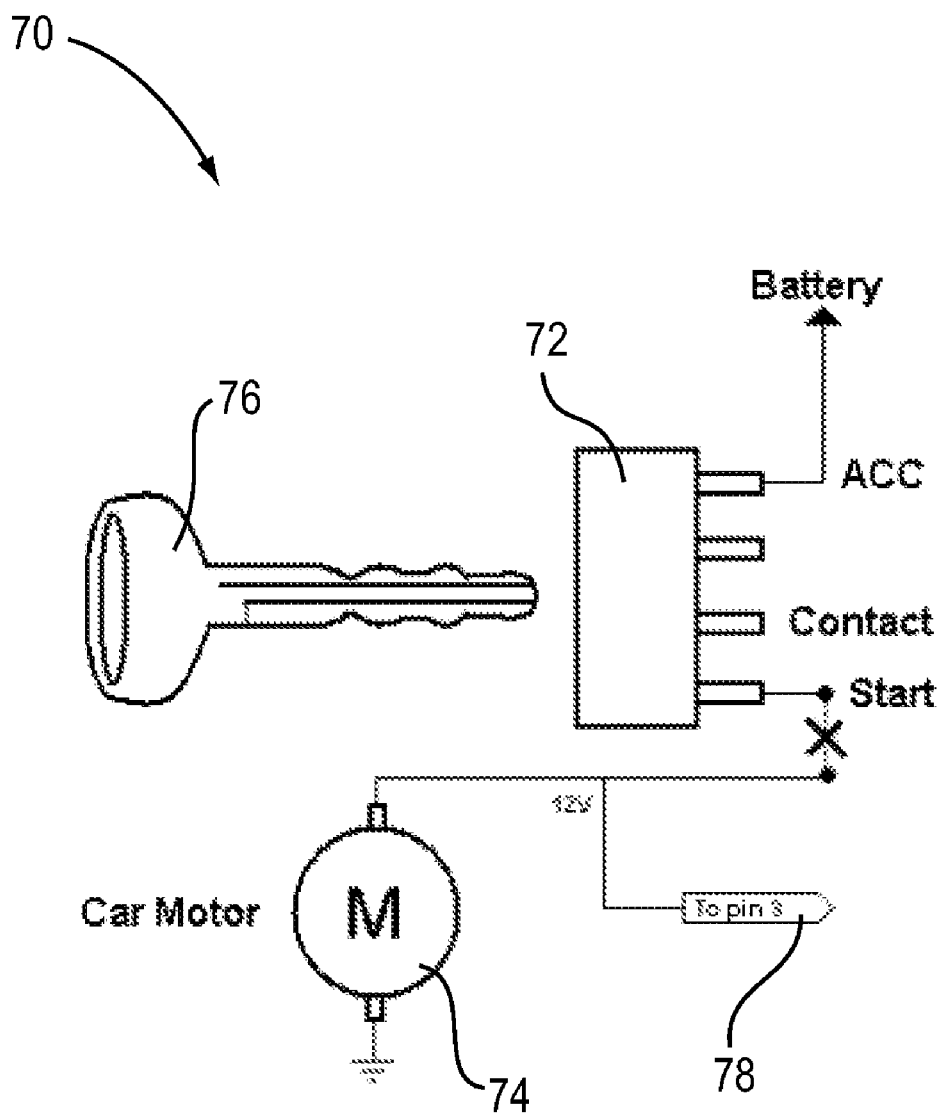
FIG. 7 is a diagrammatic view of a connection of a start motor to an automated vehicle sunshade.

FIG. 7 shows a connection 70 to the start motor in accordance with particular embodiments of the present invention. The connection includes a starter 72, a car motor 74 and a connector 78. The connector 78 is connected to the starter connector 58 of the circuit 50 of FIG. 6. As the key 76 is turned to the off position, the sunshade may then be activated and extended. When the key 76 is turned to the on position, the sunshade must be closed.

Figure 8:
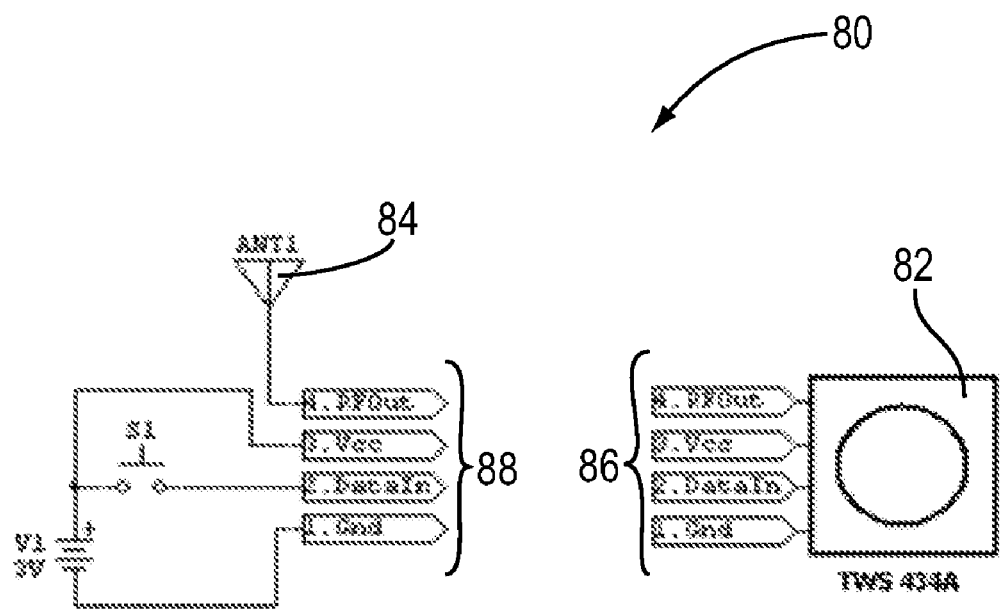
FIG. 8 is a schematic view of a transmitter using a TWS 434A transmitter.

FIG. 8 shows a TWS-434A transmitter 80 in accordance with particular embodiments of the present invention. The transmitter 80 includes an activation switch 82 that may include antenna connectors 86. The transmitter 80 also includes an antenna 84. The antenna 84 may have starter connectors 88 that are correspondingly connectable to the antenna connectors 86 of the activation switch 82. The activation switch 82 allows the transmitter 80 to transmit a signal at a predetermined frequency that may be received by a receiver of a vehicle sunshade to extend or retract the shade.

Figure 9:
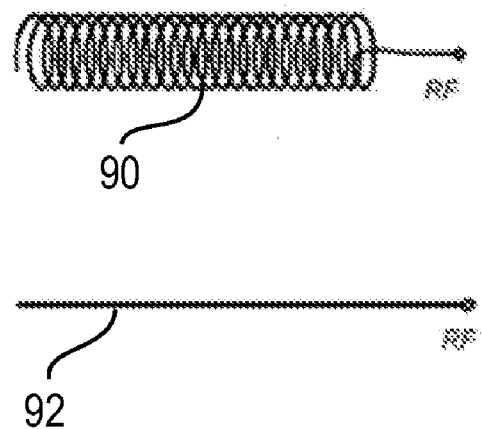
FIG. 9 is a side view of two antennas of an automated vehicle sunshade.

FIG. 9 depicts antennas 90 and 92 that may be used with each the transmitter 80 and the receiver 50. The antenna 90 is a helical antenna, while the antenna 92 is a whip antenna. It will be understood that other various types of antennas may be used.

Figure 10:
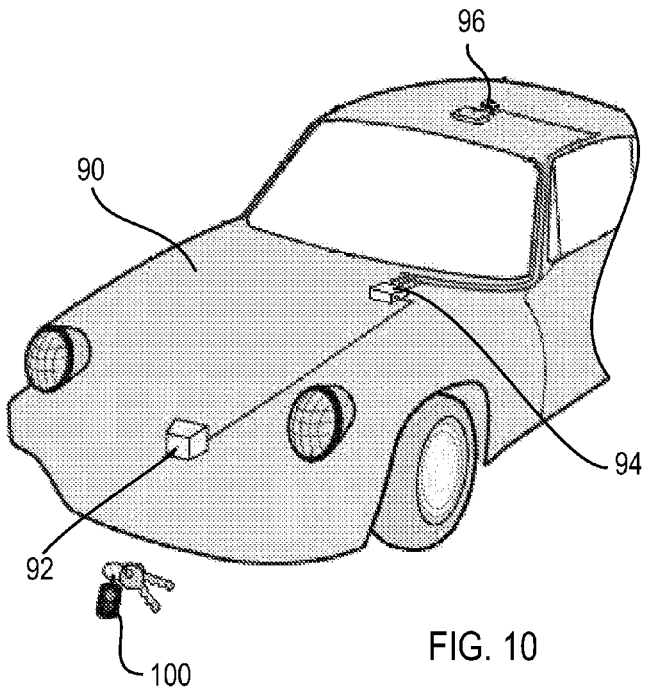
FIG. 10 is a perspective view of a connection of an automated vehicle sunshade with a vehicle.

FIG. 10 depicts a receiver circuit 94 connected to a vehicle 90 in accordance with particular embodiments of the present invention. The circuit is connected to a key code receiver 92. The circuit receiver 94 may then have the male circuit coupled to a roof portion of the vehicle 90 to connector to the vehicle sunshade. The keys 100 may then have a transmitter to activate the sunshade.

Figure 11:
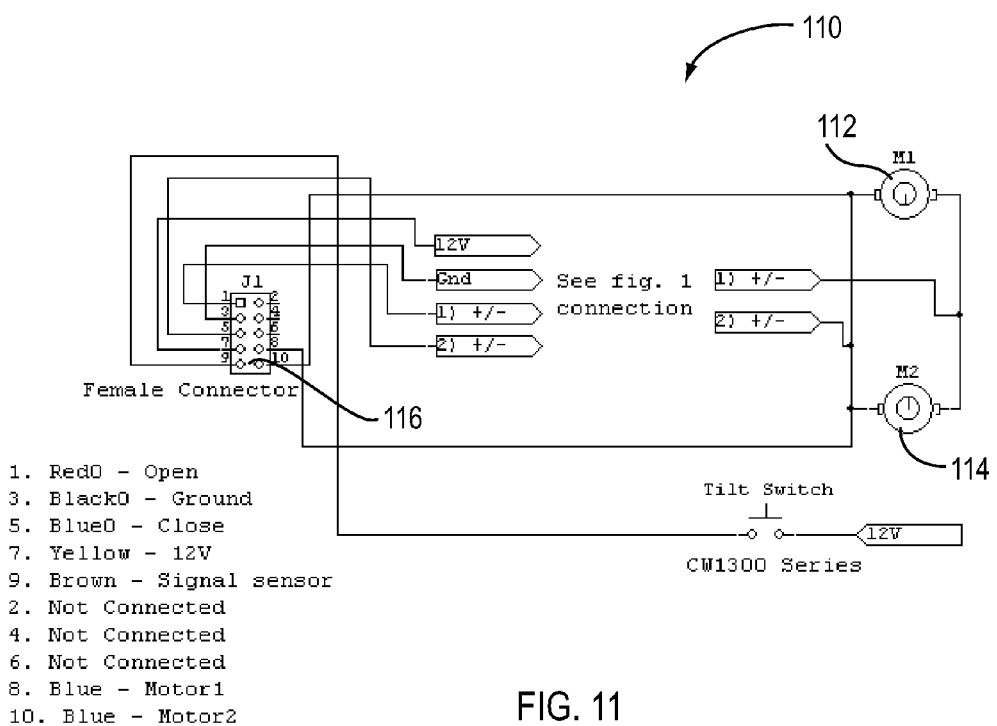
FIG. 11 is a schematic view of a connector to an automated vehicle sunshade.
Figure 12:
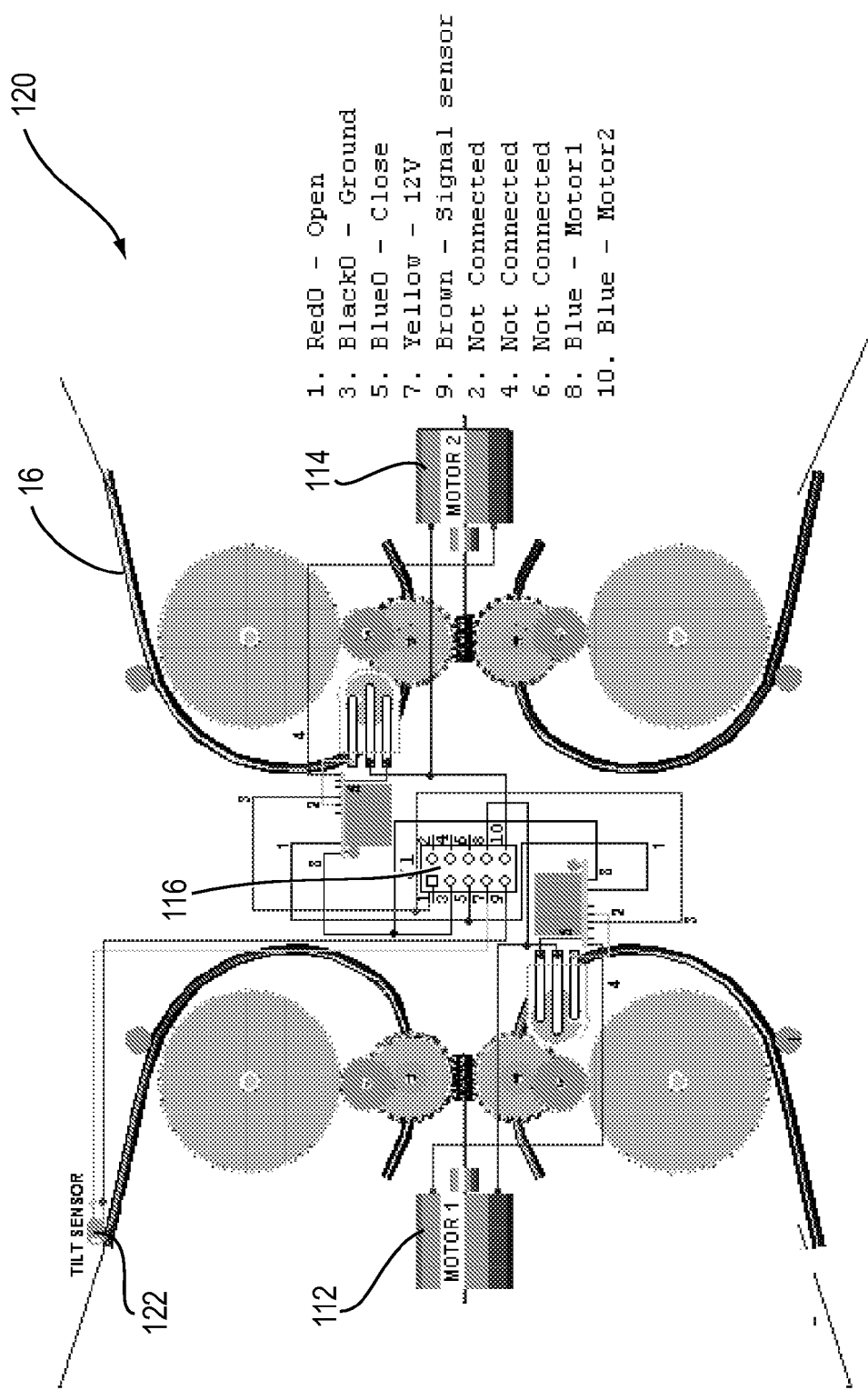
FIG. 12 is a schematic view of a connector connected to a drive device of an automated vehicle sunshade.

FIGS. 11 and 12 depict a connector 110 to the vehicle sunshade drive device. The connector includes a first motor 112, a second motor 114 and a connector 116. The connector connects each of the motors 112 and 114 to the drive device 120 of the sunshade to extend and retract the shade properly, and substantially simultaneously. The connector may also be coupled to a tilt sensor 122. The tilt sensor 122 allows the sunshade to determine if the weather is too adverse for the shade to remain extended. If the tilt sensor 122 determines that the shade has tilted a predetermined number of degrees, the vehicle sunshade may automatically retract to avoid damage.

Figure 13:
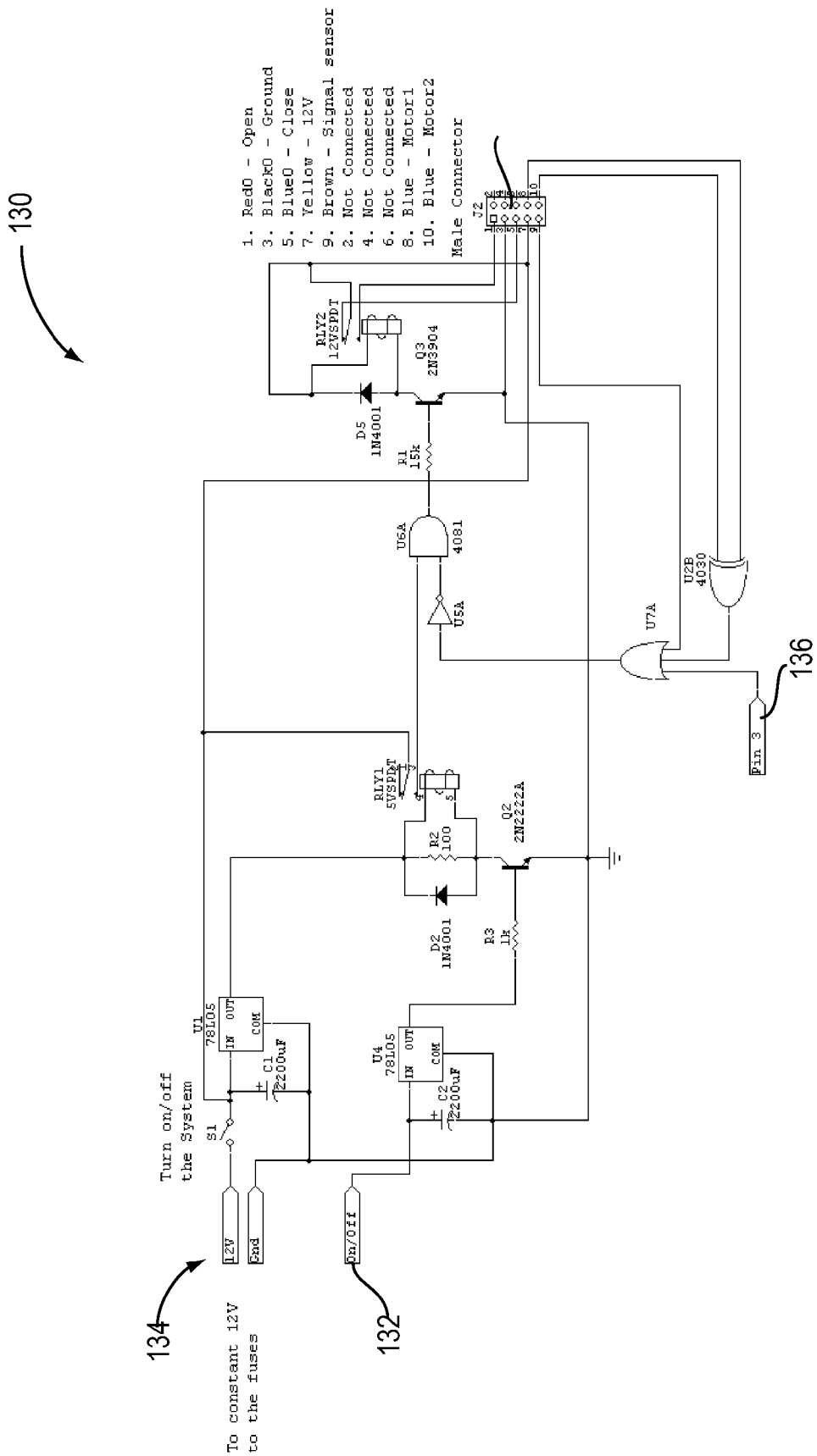
FIG. 13 is schematic view of a control circuit used with a vehicle alarm system.

Referring again to the drawings and for the exemplary purposes of this disclosure, FIGS. 13-17 depict a particular embodiment an automated vehicle sunshade utilizing a vehicle alarm transmitter in accordance with the present invention. FIG. 13 shows a control circuit 130. The circuit 130 includes among other components, a switch 132, a battery connector 134, a starter connector 136 and a drive device male connector 138. The battery connector 134 provides the connection to a power source to operate the circuit 130. The male connector 138 is used to connect to the drive device of the vehicle sunshade. The starter connector 136 allows the starter of the vehicle to be connected to the circuit 130.

Figure 14:
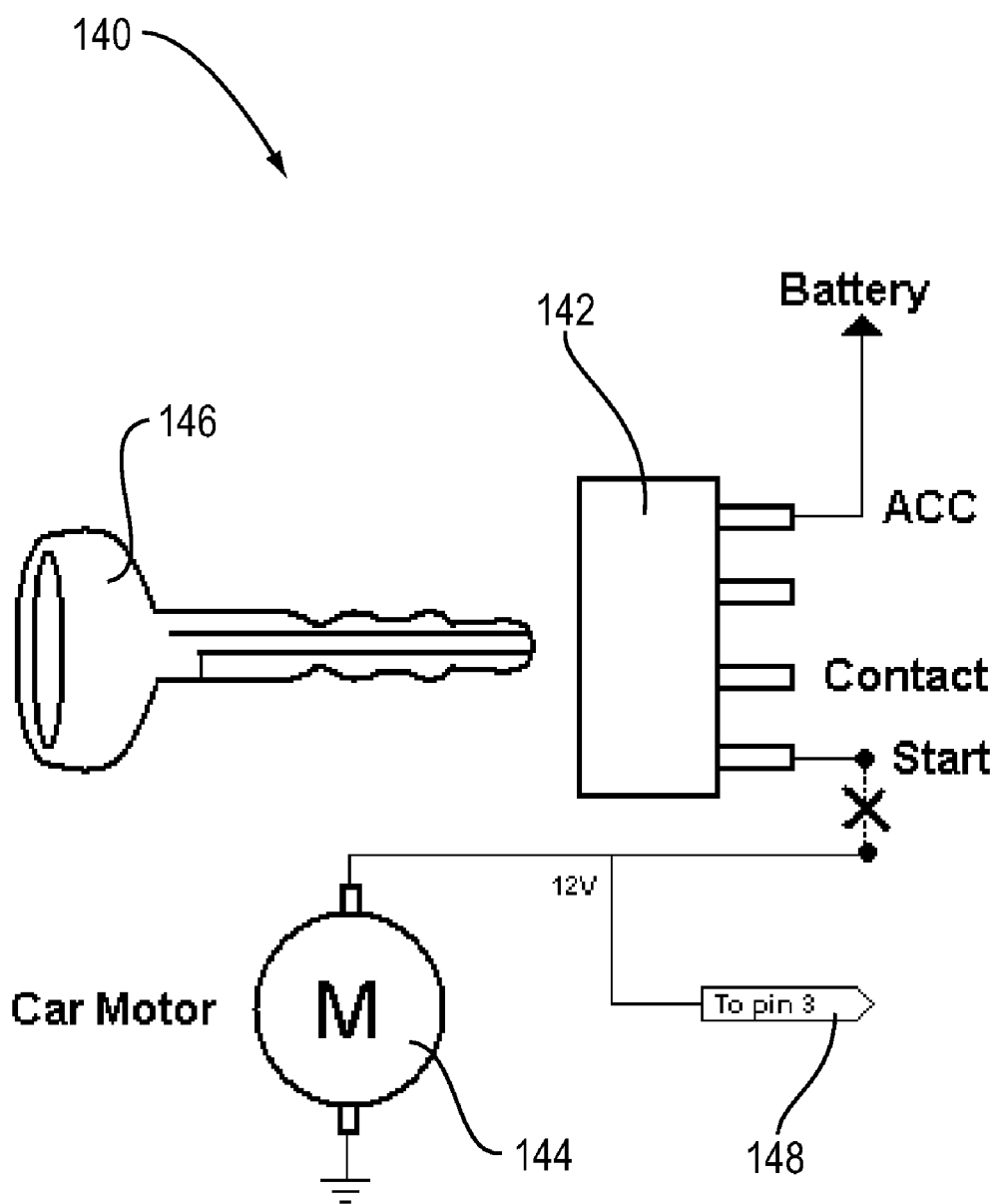
FIG. 14 is a diagrammatic view of a connection of a start motor to an automated vehicle sunshade used with a vehicle alarm system.

FIG. 14 shows a connection 140 to the start motor in accordance with particular embodiments of the present invention. The connection includes a starter 142, a car motor 144 and a connector 148. The connector 148 is connected to the starter connector 136 of the circuit 130 of FIG. 13. As the key 146 is turned to the off position, the sunshade may then be activated and extended. When the key 146 is turned to the on position, the sunshade must be closed.

Figure 15:
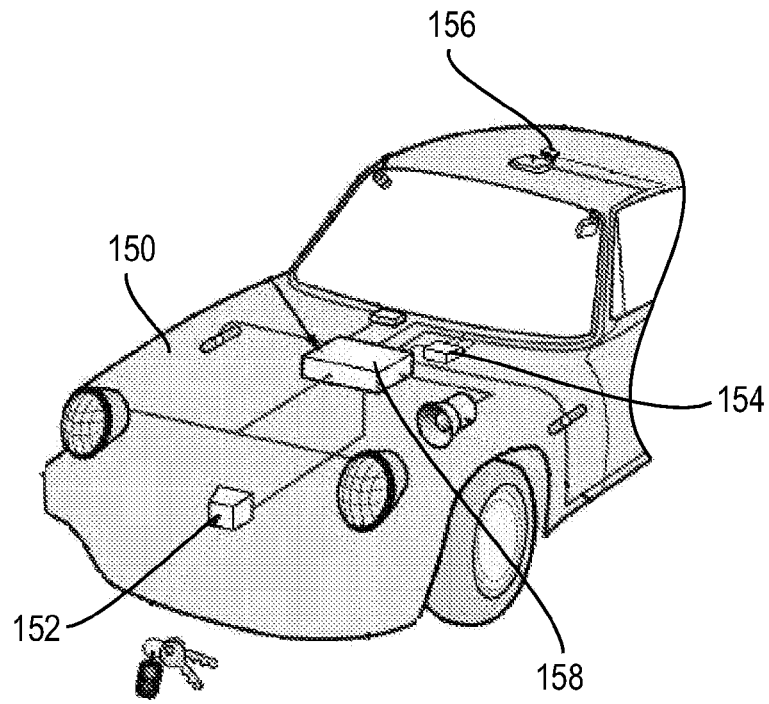
FIG. 15 is a perspective view of a connection of an automated vehicle sunshade with a vehicle alarm system.

FIG. 15 depicts a control circuit 154 connected to a vehicle 150 in accordance with particular embodiments of the present invention. The control circuit 154 and a key code receiver 152 are each connected to a vehicle alarm controller 158. The control circuit 154 may then have the male connector 156 coupled to a roof portion of the vehicle 150 to connector to the vehicle sunshade. The keys 159 may then have a transmitter to activate the alarm and by activation of the alarm, the sunshade may also extend. Deactivating the alarm may cause the shade to retract.

Figure 16:
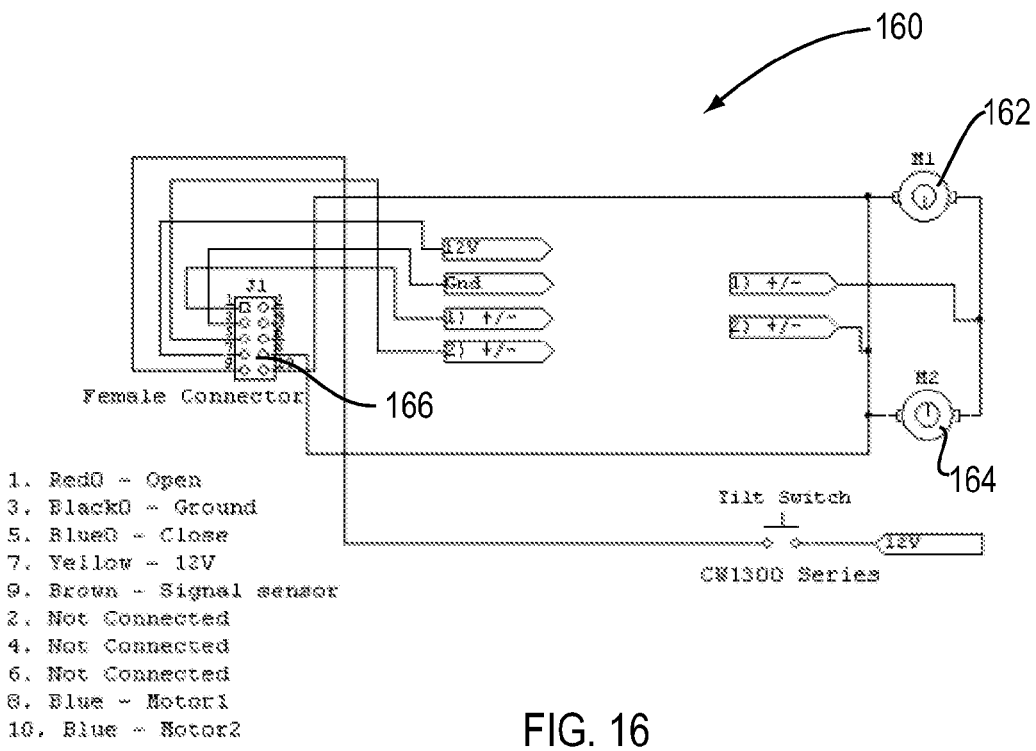
FIG. 16 is a schematic view of a connector for use with an automated vehicle sunshade configured for use with a vehicle alarm system.
Figure 17:
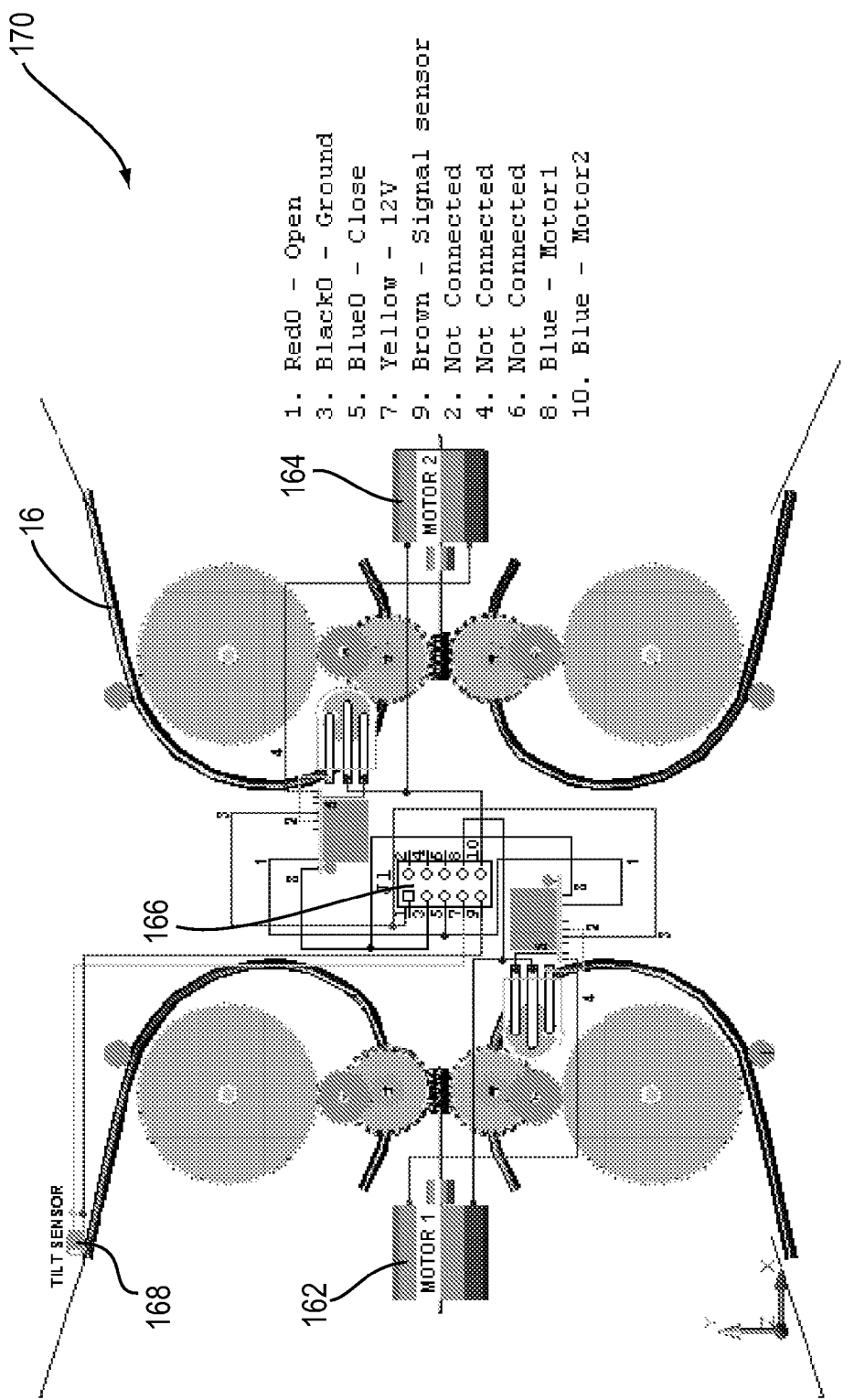
FIG. 17 is a schematic view of a connector connected to a drive device of an automated vehicle sunshade configured for use with a vehicle alarm system.

FIGS. 16 and 17 depict a connector 160 to the vehicle sunshade drive device. The connector includes a first motor 162, a second motor 164 and a connector 166. The connector connects each of the motors 162 and 164 to the drive device 170 of the sunshade to extend and retract the shade properly, and substantially simultaneously. The connector may also be coupled to a tilt sensor 168. The tilt sensor 168 allows the sunshade to determine if the weather is too adverse for the shade to remain extended. If the tilt sensor 168 determines that the shade has tilted a predetermined number of degrees, the vehicle sunshade may automatically retract to avoid damage.

Figure 18:
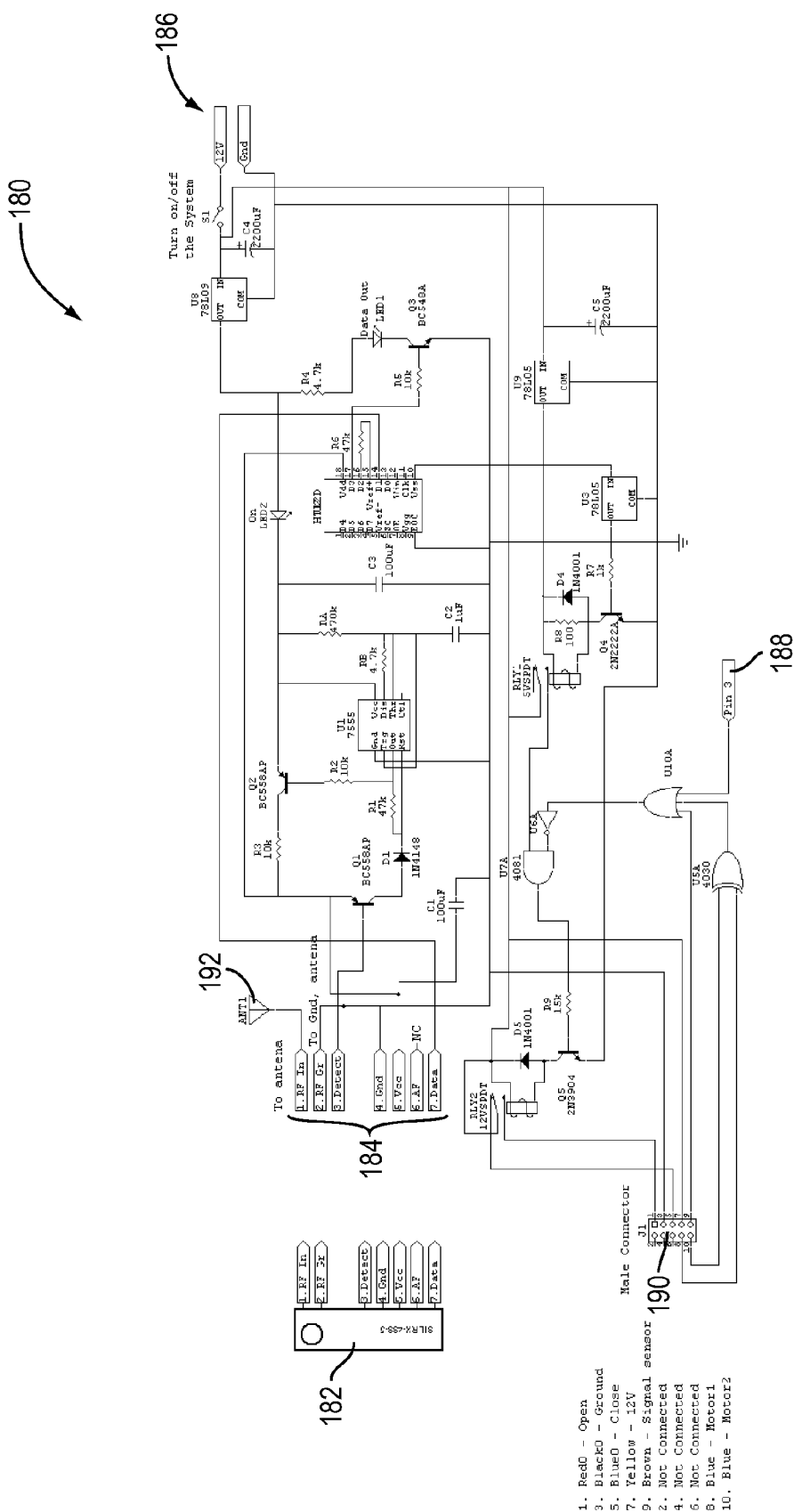
FIG. 18 is a schematic view of a reception circuit using an SILRX-433-5 radio receiver.

Another particular embodiment of the present invention as shown in FIGS. 18-24, include an automated vehicle sunshade that utilizes a SILRX-433-5 radio receiver, which integrates a complete FM superhet UHF radio receiver on a small module. FIG. 18 shows a reception circuit 180 using the SILRX-433-5 receiver. The circuit 180 includes among other components, a tuner 182, a tuner connector 184 to connect the tuner 182 to the circuit 180, a battery connector 186, a starter connector 188, a drive device male connector 190 and an antenna 192. The antenna 192 receives the signal in accordance to the frequency provided by the tuner 182. The battery connector 186 provides the connection to a power source to operate the circuit 180. The male connector 190 is used to connect to the drive device of the vehicle sunshade. The starter connector 188 allows the starter of the vehicle to be connected to the circuit 180.

Figure 19:
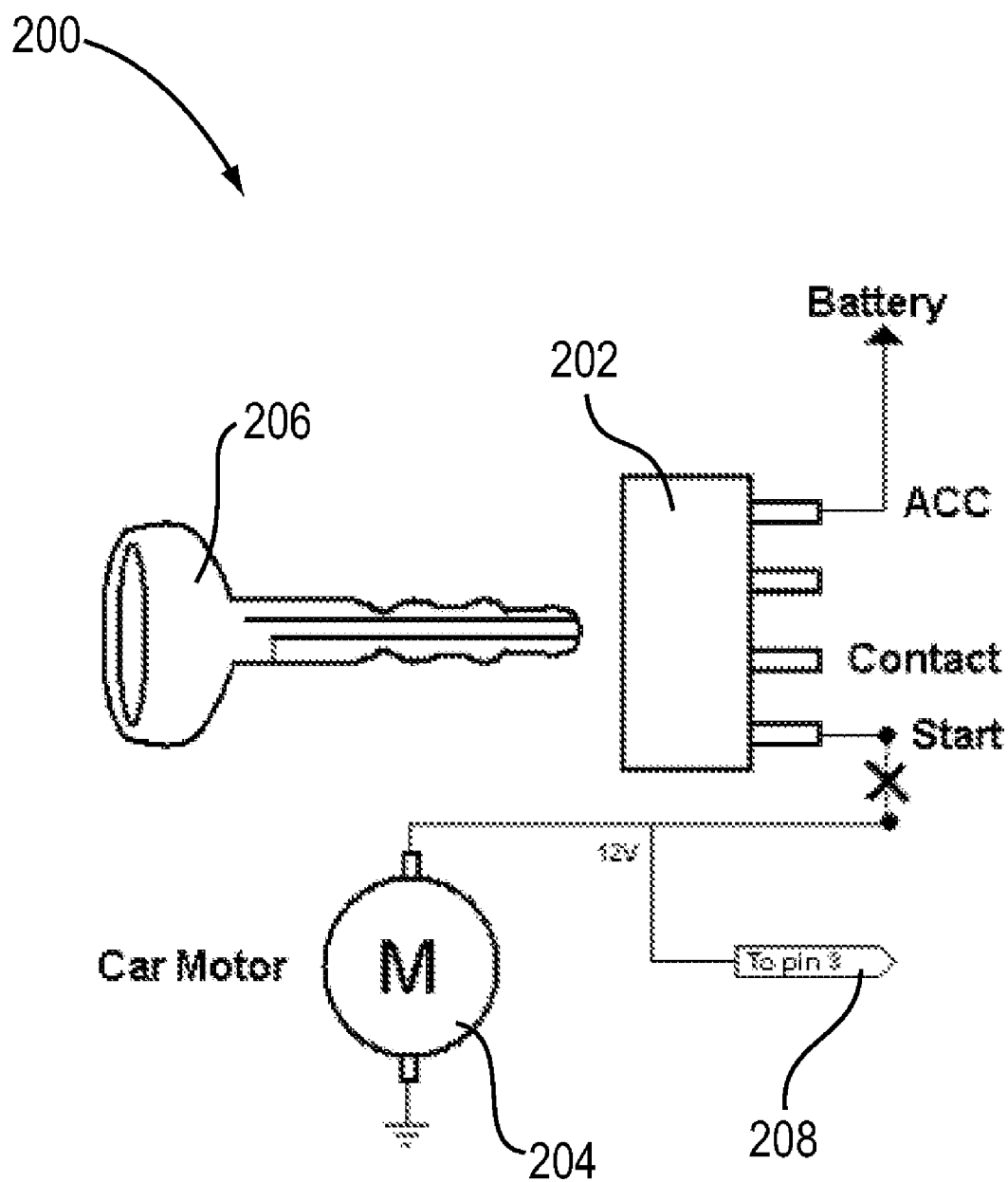
FIG. 19 is a diagrammatic view of a connection of a start motor to an automated vehicle sunshade using an SILRX-433-5 radio receiver.

FIG. 19 shows a connection 200 to the start motor in accordance with particular embodiments of the present invention. The connection includes a starter 202, a car motor 204 and a connector 208. The connector 208 is connected to the starter connector 188 of the circuit 180 of FIG. 18. As the key 206 is turned to the off position, the sunshade may then be activated and extended. When the key 206 is turned to the on position, the sunshade must be closed.

Figure 20:
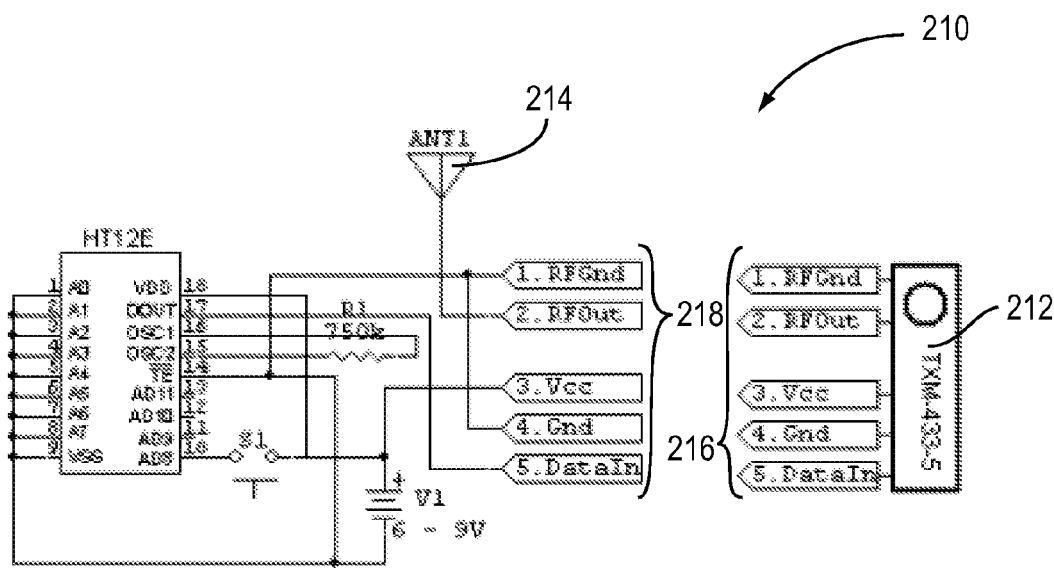
FIG. 20 is a schematic view of a transmitter using a TMX-433-5 transmitter.

FIG. 20 shows a TMX-433-5 transmitter 210 in accordance with particular embodiments of the present invention. The transmitter 210 includes an activation switch 212 that may include antenna connectors 216. The transmitter 210 also includes an antenna 214. The antenna 214 may have starter connectors 218 that are correspondingly connectable to the antenna connectors 216 of the activation switch 212. The activation switch 212 allows the transmitter 210 to transmit a signal at a predetermined frequency that may be received by a receiver of a vehicle sunshade to extend or retract the shade.

Figure 21:
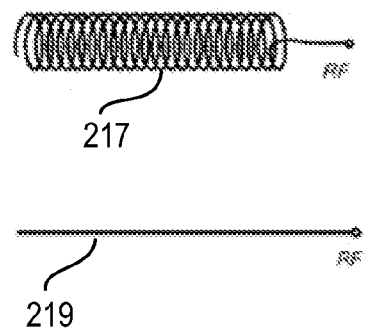
FIG. 21 is a side view of two antennas of an automated vehicle sunshade configured for use with an SILRX-433-5 radio receiver.

FIG. 21 depicts antennas 217 and 219 that may be used with each the transmitter 210 and the receiver 180. The antenna 217 is a helical antenna, while the antenna 219 is a whip antenna. It will be understood that other various types of antennas may be used.

Figure 22:
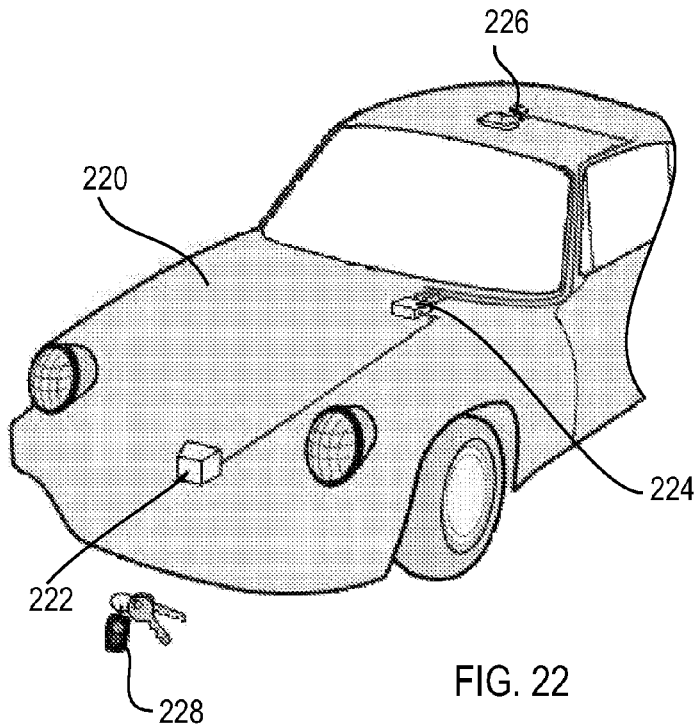
FIG. 22 is a perspective view of a connection of an automated vehicle sunshade configured for use with an SILRX-433-5 radio receiver with a vehicle.

FIG. 22 depicts a receiver circuit 224 connected to a vehicle 220 in accordance with particular embodiments of the present invention. The circuit is connected to a key code receiver 222. The circuit receiver 224 may then have the male connector 226 coupled to a roof portion of the vehicle 220 to connector to the vehicle sunshade. The keys 228 may then have a transmitter to activate the sunshade.

Figure 23:
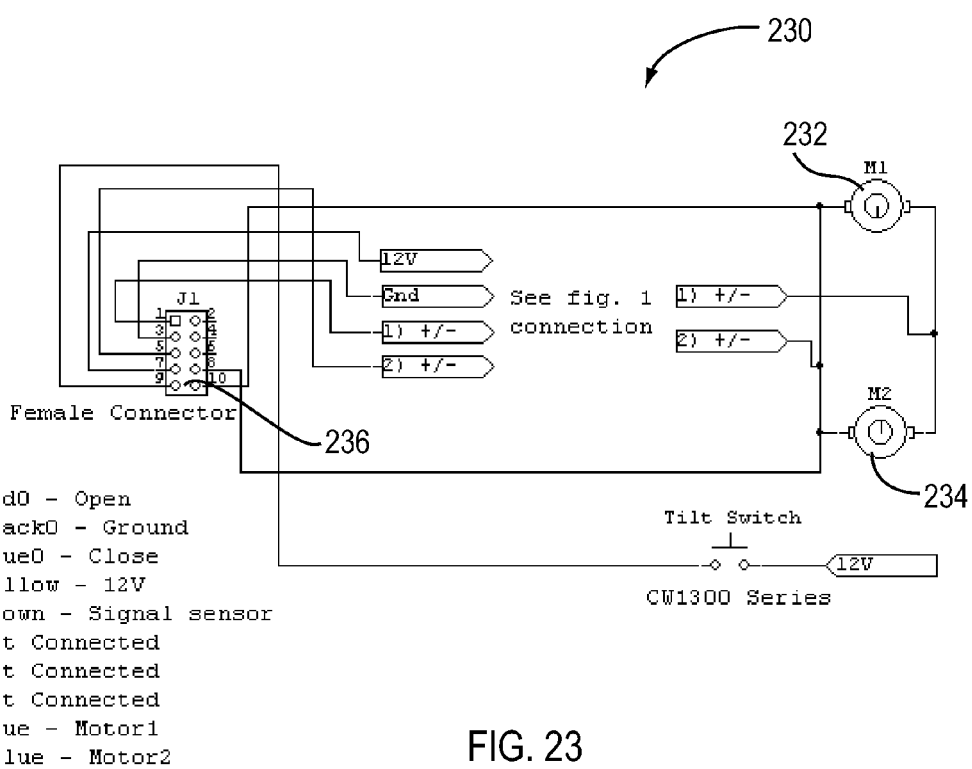
FIG. 23 is a schematic view of a connector to an automated vehicle sunshade configured for use with an SILRX-433-5 radio receiver.
Figure 24:
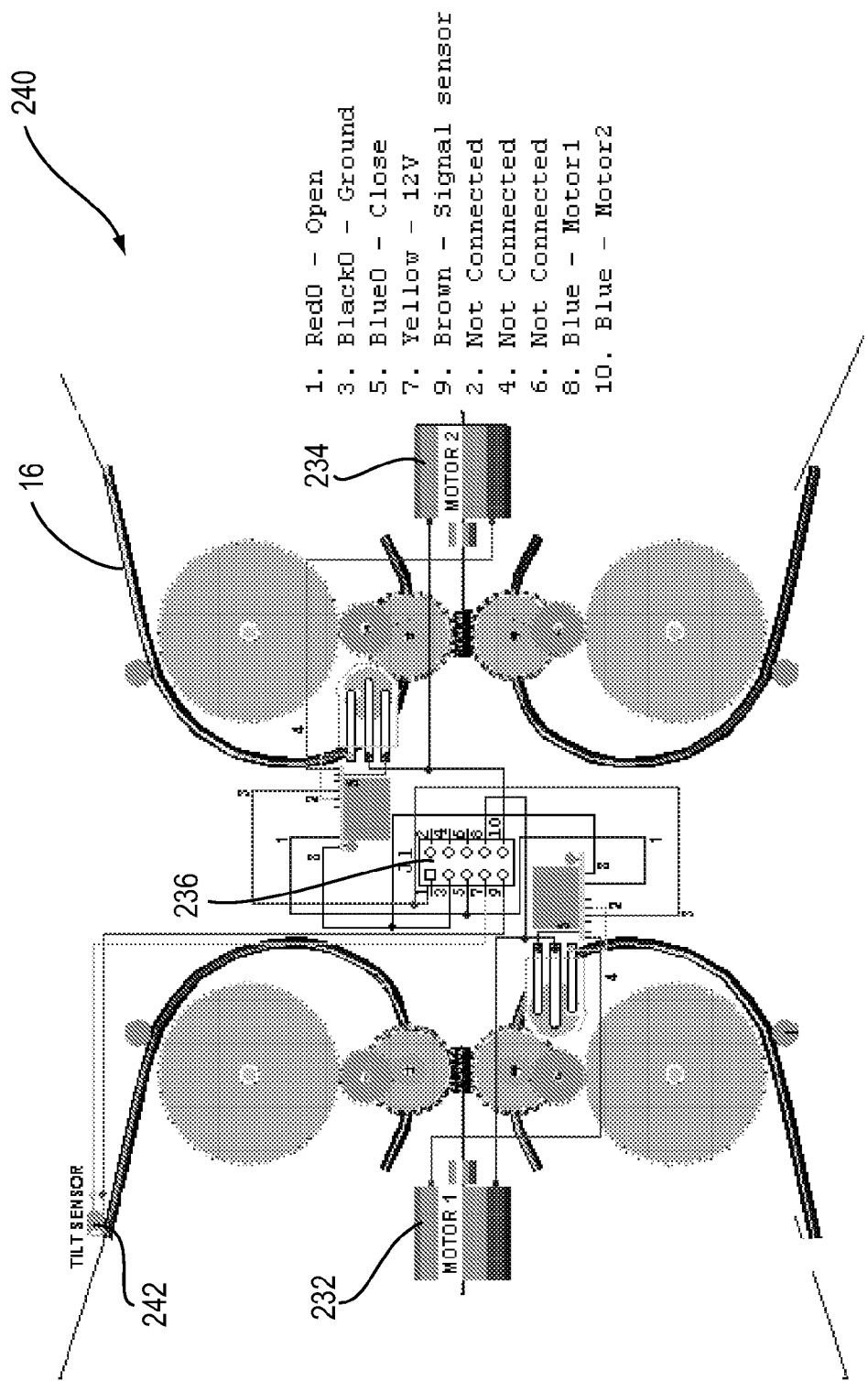
FIG. 24 is a schematic view of a connector connected to a drive device of an automated vehicle sunshade configured for use with an SILRX-433-5 radio receiver.

FIGS. 23 and 24 depict a connector 230 to the vehicle sunshade drive device. The connector includes a first motor 232, a second motor 234 and a connector 236. The connector connects each of the motors 232 and 234 to the drive device 240 of the sunshade to extend and retract the shade properly, and substantially simultaneously. The connector may also be coupled to a tilt sensor 242. The tilt sensor 242 allows the sunshade to determine if the weather is too adverse for the shade to remain extended. If the tilt sensor 242 determines that the shade has tilted a predetermined number of degrees, the vehicle sunshade may automatically retract to avoid damage.

It will be understood that particular embodiments of the present invention may include a vehicle shade device wherein a length of the flexible shade is greater than a length of the vehicle and a width of the flexible shade is greater than a width of the vehicle.

Other particular embodiments of the present invention include an automated sunshade that further comprises a remote control. The remote control may provide for remotely activating the drive device and thereby extending and/or retracting the shade. In particular embodiments, the sunshade may be electrically coupled to an alarm system of the vehicle, such that when the alarm system is set, the sunshade may be extended and when the alarm system is deactivated, the sunshade is retracted. Additionally, the sunshade may further comprise a weather sensor wherein during certain types of weather, the sensor will determine the weather type and activate the drive device to retract the shade. For example, the sensor may be a wind sensor wherein the rate of travel of wind is measured by the sensor and the sunshade automatically retracts when the rate of travel of wind is higher than a predetermined rate to protect the sunshade from wind damage. Also, the sensor may be a thermometer, wherein if the ambient temperature drops below a predetermined temperature, the sunshade automatically retracts. The sensor according to embodiments of the present invention may be utilized with a controller that activates a motor of the drive device. In these particular embodiments, the controller may comprise a memory wherein the predetermined weather factors are stored and referenced by the controller to determine if retraction of the shade is required.

Further still, other particular embodiments of the present invention may provide for various types of power sources. For example, and without limitation, the power source may be supplied by the battery of the vehicle, wherein a power inverter may be utilized to provide the proper power to activate the drive device. Power of the battery would only be drawn upon during activation of the drive device. Another example, without limitation, may be an independent power source, such as a battery.

It will be understood that various ways of mounting an automated vehicle sunshade may be utilized without departing from the scope of this disclosure. For example, and without limitation, the mounting may include devices such as, magnets, straps, clamps, tie downs, clips, fasteners, bolts, adhesives, hook-and-loop fasteners, and any combinations thereof. The sunshade may be mounted on parts of a vehicle including, but not limited to a roof and a roof rack. Further, the sunshade may be permanently mounted on the vehicle, removably mounted on the vehicle or integral to the vehicle. In instances where the sunshade is integral to the vehicle, the compartment may be mechanically extended from the roof of the vehicle before activating the drive device.

For example, an integral vehicle sunshade may be provided as a vehicle upgrade, similar to a sunroof. The sunshade may not be readily distinguishable as a sunshade and provides a streamline aesthetic appearance.

Particular embodiments of the present invention may include an automated sunshade that is provided in various colors, shades, and surface treatments, so as to compliment the aesthetic qualities of the vehicle the sunshade is mounted to. Additionally, the shade portion of the sunshade may be of a complimentary color and/or may be of a highly reflective material and color.

It will be understood by those of ordinary skill in the art that while the present invention includes an automated vehicle sunshade, the sunshade may be manually operated. For example, if there is a type of malfunction of the motor, the power source and/or the like, the sunshade may still be retractable and extendable without a power source. It will also be understood that the automated vehicle shade may be utilized to shade areas around the vehicle depending on the placement of the sunshade on the vehicle. This enables shade to be provided near the vehicle for uses, such as, but not limited to, tailgate parties, road side concessions, parade viewing and the like.

It will be understood that particular embodiments of the present invention may be used in other types of weather conditions, such as, but not limited to snow and other cold weather. For example, the automated vehicle sunshade may be used to shield the windows of a vehicle from retaining snow on the windows, thereby requiring no need for brushing of the snow away from the windows with a snow brush. Additionally, cold weather is often accompanied with ice formation on windows and often in door locks. Embodiments of the present invention may be used to shield the car, similar to a covering over a parking spot and prevent ice from forming on the windows and the within the key lock, thereby requiring no scraping of ice with an ice scraper nor requiring the deicing of the lock.

Accordingly, the components defining any embodiment of an automated vehicle sunshade may be formed of any of many different types of materials or combinations thereof that can readily be formed into shaped objects provided that the components selected are consistent with the intended operation of an automated vehicle sunshade. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any embodiment of an automated vehicle sunshade may be purchased pre-manufactured or manufactured separately and then assembled together. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, the shape of the sunshade is not limited to a frusto-pyramidal shape, but may be any shape such as, but not limited to a dome, a pyramid, and the like, so long as the sunshade provides the proper shade over the windows and portions of the car in accordance with the present invention. Further, the sunshade may be of various sizes for various sizes of vehicles, or alternatively, the sunshade may be one size that is universal for all or substantially all vehicle sizes.

What is claimed is:

1. A sunshade comprising:
   a compartment mountable to a roof of a vehicle;
   a flexible shade;
   a plurality of rods coupled to the flexible shade, wherein the plurality of rods are retractable and extendable;
   a drive device coupled to the plurality of rods;
   a plurality of guide wires coupled to the flexible shade, wherein the plurality of guide wires comprise a first set of guide wires that is transverse to a second set of guide wires, wherein a first end of each one of the plurality of guide wires is coupled to the drive device and a second end of each one of the plurality of guide wires is coupled to an edge of the flexible shade; and
   a plurality of support wires, wherein each one of the plurality of supports wires comprises a first end that is coupled to the drive device and a second end that is coupled to the second end of one of the plurality of rods.

2. The sunshade of claim 1, wherein the sunshade is configured to alternate between an extended position and a retracted position.

3. The sunshade of claim 2, wherein the flexible shade, the plurality of rods and the drive device are enclosed within the compartment when the sunshade is in the retracted position.

4. The sunshade of claim 1, wherein the sunshade is automated.

5. The sunshade of claim 4, further comprising a remote control.

6. The sunshade of claim 1, further comprising a sensor, wherein the sunshade is configured to automatically extend or retract in response to predetermined weather conditions sensed by the sensor.

7. The sunshade of claim 1, wherein each one of the plurality of rods comprises a first end that is coupled to the drive device and a second end that is coupled to a corner of the flexible shade.

8. The sunshade of claim 7, wherein each one of the plurality of rods is curved such that the second end of each one of the plurality of rods is disposed below the first end when the sunshade is in an extended position.

* * * * *